United States Patent
Grasset

(10) Patent No.: US 7,671,748 B2
(45) Date of Patent: Mar. 2, 2010

(54) RADIOFREQUENCY IDENTIFICATION DEVICE (RFID) AFFIXED TO AN OBJECT TO BE IDENTIFIED

(75) Inventor: Yannick Grasset, Vallauris (FR)

(73) Assignee: ASK S.A., Sophia Antipolis (FR)

( * ) Notice: Subject to any disclaimer, the term of this patent is extended or adjusted under 35 U.S.C. 154(b) by 246 days.

(21) Appl. No.: 11/777,474

(22) Filed: Jul. 13, 2007

(65) Prior Publication Data

US 2008/0018476 A1 Jan. 24, 2008

(30) Foreign Application Priority Data

Jul. 21, 2006 (FR) .................................. 06 06657

(51) Int. Cl.
*G08B 13/14* (2006.01)
*H03G 11/04* (2006.01)
*H03G 11/00* (2006.01)

(52) U.S. Cl. ................. 340/572.7; 340/572.1; 340/657; 340/660; 340/663; 333/17.1; 333/17.2

(58) Field of Classification Search ....................... None
See application file for complete search history.

(56) References Cited

U.S. PATENT DOCUMENTS 6,317,027 B1 * 11/2001 Watkins ..................... 340/10.1
2005/0143026 A1 * 6/2005 Bellantoni .................. 455/121
2005/0231367 A1 * 10/2005 Bellantoni ............... 340/572.1
2007/0096842 A1 * 5/2007 Hyun et al. ................. 333/1.1
2008/0084277 A1 * 4/2008 Korekoda .................. 340/10.1
2008/0116990 A1 * 5/2008 Rokhsaz ...................... 333/32
2008/0211630 A1 * 9/2008 Butler et al. ............... 340/10.1
2009/0001941 A1 * 1/2009 Hsu et al. ................... 323/211

* cited by examiner

*Primary Examiner*—Julie Lieu
(74) *Attorney, Agent, or Firm*—James C. Lydon

(57) ABSTRACT

A radiofrequency identification device (RFID) featuring an antenna (10) connected to a chip designed to be affixed to an object to be identified by a remote reader transmitting to the identification device electromagnetic signals received by the antenna and containing the data allowing the identification as well as the supply voltage ($V_{DC}$) of the device, the antenna transmitting in return to said reader signals provided by the chip by retromodulation by means of a switch (22) in the chip whose open or closed position defines the digital identification data transmitted by the device. The chip features a variable impedance (30) connected in series with the switch to the terminals of the antenna and a means for detecting (32) the supply voltage to adjust the impedance value so that this supply voltage is always greater than a predetermined value ($V_{threshold}$) below which the device can no longer transmit digital identification data.

4 Claims, 4 Drawing Sheets

RADIOFREQUENCY IDENTIFICATION DEVICE (RFID) AFFIXED TO AN OBJECT TO BE IDENTIFIED

TECHNICAL FIELD

This invention concerns the identification of objects by a remote reader using portable contactless devices (RFID) and more specifically a radiofrequency identification device that can be identified despite its distance from the reader.

BACKGROUND ART

The portable devices, such as contactless smart labels (tags), are widely used today for identifying any objects by a remote reader.

Generally, the label also known as a radiofrequency identification device (RFID) is used to recognize or identify, at a fairly large distance and within a very short time, an object, an animal or a person carrying the label. Such an electronic label essentially consists of an integrated circuit containing an electronic identification device in which the data that is part of the considered application is stored in memory and an antenna connected to the integrated circuit. The information contained in the chip is read by a reader, which transmits electromagnetic signals at a given frequency to the label. The label being a passive device, the reader provides it with power enabling the RFID device to transmit in return the contents of the memory such as the identification number. A dialog is established according to a predefined communication protocol and a certain amount of data is thus exchanged between the label and the reader.

The communication between the label and the reader cannot be established without a minimum of energy. The quality and quantity of energy transferred depend on certain criteria such as the operating frequencies, the distance between the antenna of the reader and the antenna of the label, etc. The label, considered as a resonant circuit, is tuned at a given rated frequency so that there is optimum communication between it and the antenna of the reader when the label is located in the field emitted by the reader. Currently, the electromagnetic signals transmitted by the reader are in UHF mode within 860-960 MHz and 2.45 GHz frequency ranges. Transmissions in UHF mode allow exchanges at a large distance, in the order of 50 cm to 1 m or several meters, as the amount of energy required for the exchange of information between the label and the reader is very small.

FIG. 1 represents the circuit diagram of a traditional RFID device including an antenna 10 connected to a chip 12. The electromagnetic signals received are rectified by the diodes 15 and 16. The capacitance 14 is used as AC link to UHF signals. As for the polarized capacitor 18, it plays the role of a reservoir capacitance to provide the supply voltage to the chip. All the other components of the chip are equivalent to an impedance 20.

When the RFID device transmits its digital identification data to the reader, it does it by means of an electronic switch 22, at a rate linked to the output. The closure of this "switch" acts as a mismatch of the Chip—Antenna assembly. In this way a different quantity of energy is absorbed and a different quantity of energy is reflected towards the reader. A retro-modulation subcarrier frequency may also be applied by modulating this subcarrier by the open or closed position of the switch 22 defined by the digital identification data to be transmitted to the reader.

The RFID device shown in FIG. 1 has a major drawback. When the switch 22 is open, a voltage is provided to, and thus charges, the reservoir capacitance 18. But when the switch 22 is closed, even if there actually exists a non-zero impedance of the switch, it is negligible and the power received by the antenna 10 is almost entirely reflected. Only a minute quantity of this energy is supplied to the capacitance 18. The latter providing the supply voltage for data transmission therefore discharges. We can thus consider that diagram giving the voltage as a function of time at the terminals of the capacitance 18 is that shown in FIG. 2. On opening the switch 22, the capacitance discharges and changes from a minimum level Vmin at time T1 to a maximum level Vmax at time T2. Then, on closing the switch, the capacitance once again discharges from Vmax at time T2 to Vmin at time T3, and so on.

If the RFID device is quite far away from the reader, the power received is low. With an equal capacitance, the voltage at the terminals of the capacitor 18 then drops below a threshold voltage Vthreshold required for the circuits of the chip to operate and for the identification data to be transmitted.

In order to offset this drawback, the solution used at present is to increase the capacitance if distant objects have to be identified. However, we then encounter the effective area of the chip. Assuming that the capacitance is in the order of 200 pF and accepting a large capacitance per unit area in the order of 6 fF/$\mu m^2$, a capacitance surface of 33330 $\mu m^2$ is required, i.e. already more than 3% of the surface area of a chip which would occupy approximately 1 $mm^2$! Increasing the capacitance is therefore counterproductive regarding miniaturization which is an essential factor in this field. This drawback becomes an even greater handicap when the size of the chip decreases.

SUMMARY OF THE INVENTION

The object of the invention is therefore to provide a radiofrequency identification device affixed to an object to be identified which continues to operate correctly even when the object is a long way from the reader The purpose of this invention thus concerns a radiofrequency identification device (RFID) featuring an antenna connected to a chip designed to be affixed to an object to be identified by a remote reader transmitting to the identification device electromagnetic signals received by the antenna and containing the data allowing the identification as well as the supply voltage of the device, the antenna transmitting in return to the reader signals provided by the chip by retro-modulation by means of a switch whose open or closed position defines the digital identification data transmitted by the device. The chip features a variable impedance connected in series with the switch to the terminals of the antenna and a means for detecting the supply voltage to adjust the impedance value so that this supply voltage is always greater than a predetermined value below which the device can no longer transmit digital identification data.

BRIEF DESCRIPTION OF THE FIGURES

The purposes, objects and characteristics of the invention will become more apparent from the following description when taken in conjunction with the accompanying drawings in which.

Figure 1:
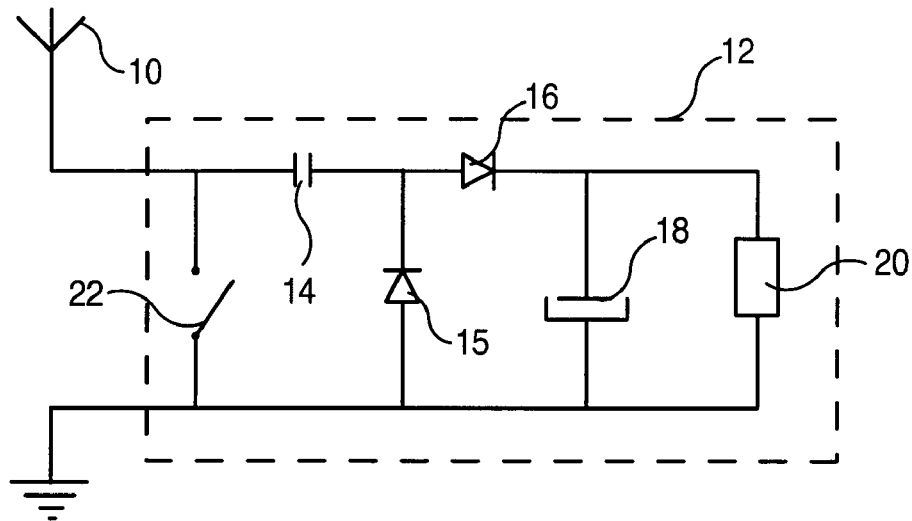
FIG. 1 represents the circuit diagram of a RFID device of the prior art.
Figure 2:
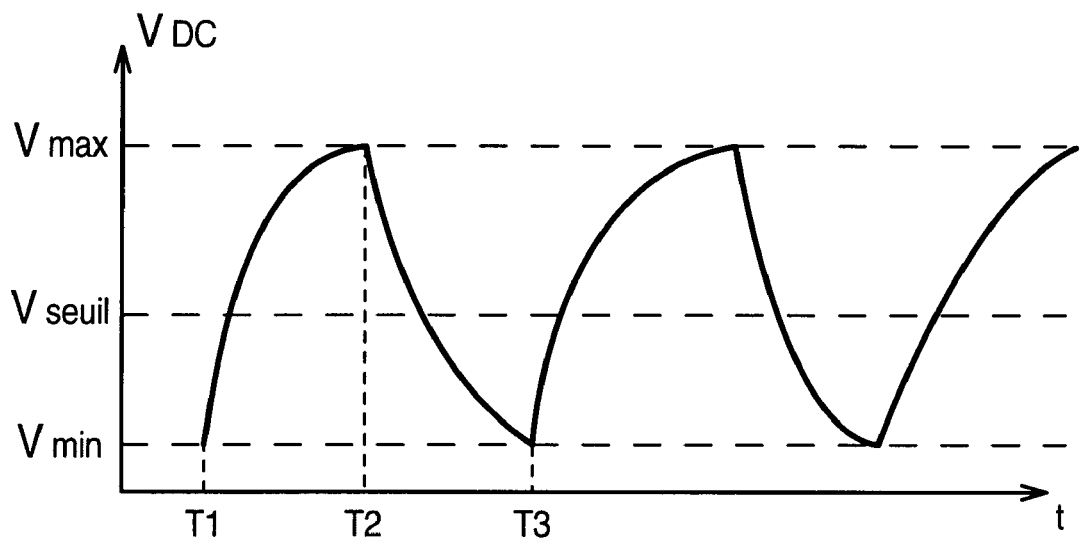
FIG. 2 is a diagram showing the voltage as a function of time at the terminals of the reservoir capacitance of the RFID device shown in FIG. 1.
Figure 3:
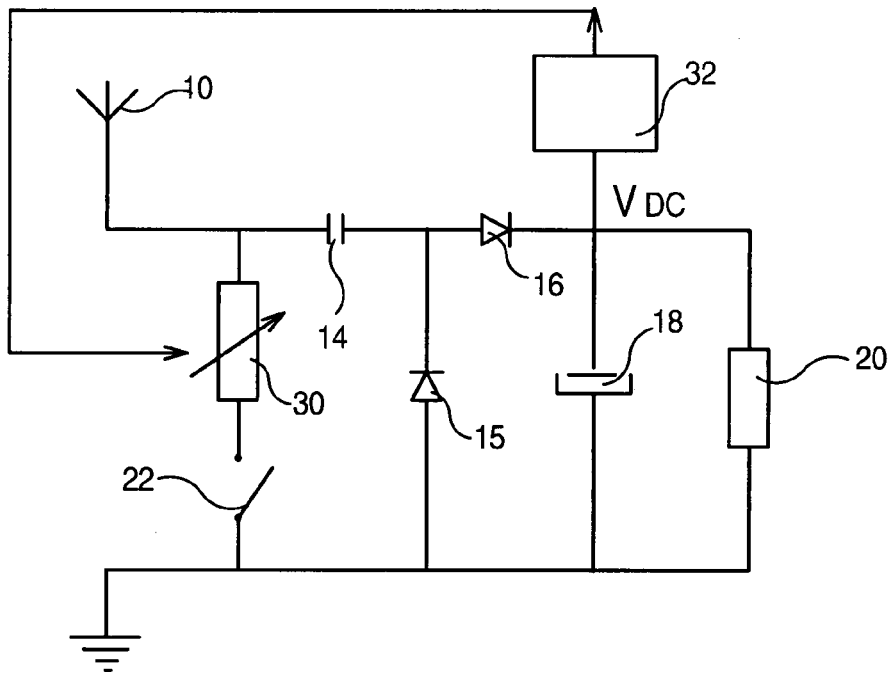
FIG. 3 represents the circuit diagram of a RFID device according to the invention.

To apply gentle retromodulation, the invention consists in installing an impedance 30 in series with the retromodulation switch 22 as shown in FIG. 3. This impedance is variable and depends on the level of power absorbed by the RFID device. The power level being inversely proportional to the impedance, the lower this impedance, the larger the required power. In order to maintain a low power so that the reservoir capacitance is not exhausted, the idea is to measure the voltage $V_{DC}$ at the terminals of the reservoir capacitance 18 and to adjust the impedance value 30 according to this voltage value.

A means of detection 32 is therefore connected to the voltage point $V_{DC}$ at the positive terminal of the reservoir capacitance. When the means of detection 32 detects a decrease in the voltage $V_{DC}$, it controls the increase of the impedance value 30 by means of the control output 34 in order to maintain a low level of absorbed power.

Figure 4:
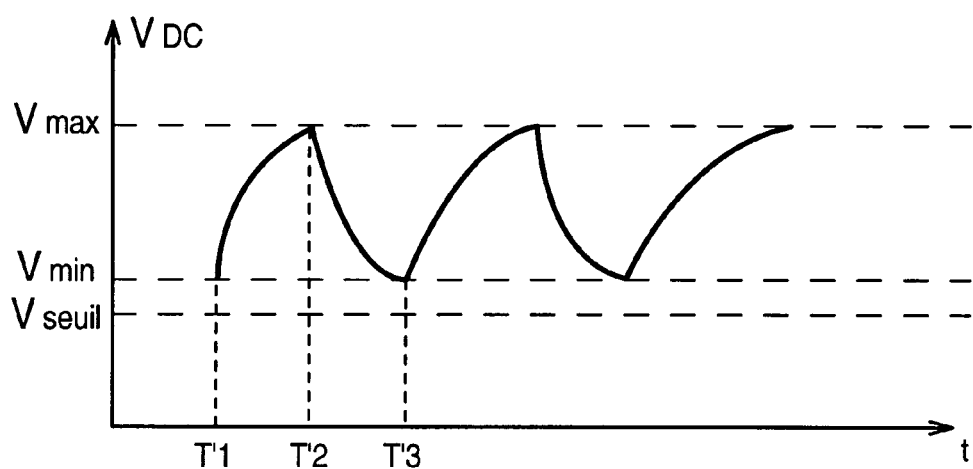
FIG. 4 is a diagram giving the voltage as a function of time at the terminals of the reservoir capacitance of the RFID device shown in FIG. 3.

The diagram shown in FIG. 4 shows the voltage $V_{DC}$ as a function of time in the case of a lightly retromodulated RFID device. During this retromodulation, the input power remains sufficiently high for the voltage $V_{DC}$ to decrease while remaining greater than the voltage Vthreshold below which the retromodulation can no longer take place.

In this manner, between the times T'1 and T'2, the voltage $V_{DC}$ changes from the Vmin voltage greater than the Vthreshold voltage to the Vmax voltage. Then between T'2 and T'3, the voltage $V_{DC}$ decreases again from Vmax to Vmin, etc. Since the voltage $V_{DC}$ always remains greater than Vthreshold, the RFID device continues to operate normally.

Figure 5:
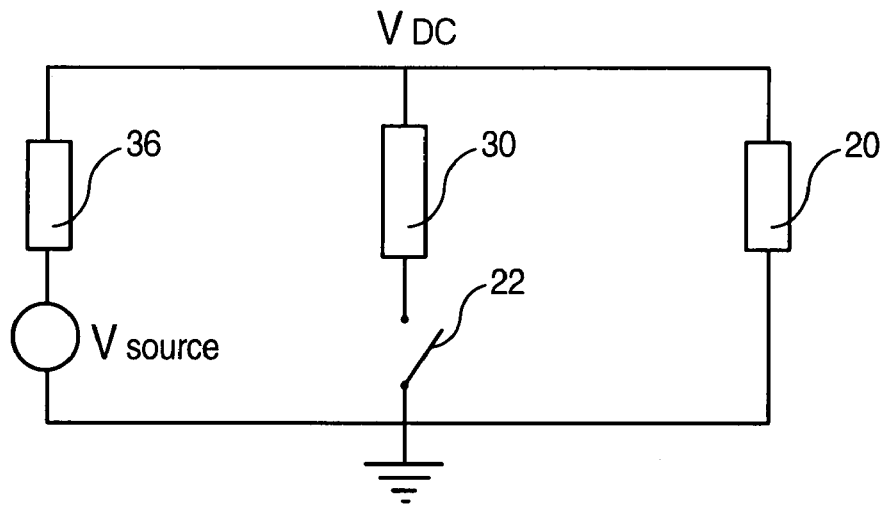
FIG. 5 represents an equivalent circuit diagram of the RFID device shown in FIG. 3.

With reference to FIG. 5 representing the equivalent diagram of the device, the antenna 10 acts as a voltage source Vsource in series with an impedance 36 with a value Zs, in parallel on the one hand with the variable impedance 30 with a value Zv in series with the switch 22 and on the other hand with the impedance 20 of chip circuits with a value Zt.

when retromodulation takes place, i.e. when the switch 22 is closed, the voltage Vsource powers the impedance 36 with a value Zs in series with the impedance Ze equivalent to impedances Zv and Zt in parallel.

The value of Ze is $$Ze=Zv \cdot Zt/(Zv+Zt)$$

The value of Ze therefore increases as a function of the variable impedance Zv and tends towards the value of Zt when the value of Zv tends towards infinity.

The value of the resultant voltage $V_{DC}$ is equal to $$V_{DC}=Vs \cdot Ze/(Ze+Zs)$$

As an example, we can consider a value of 50Ω for the two impedances Zt and Zs. In this case, the value of Ze tends towards 50Ω when Zv tends towards infinity.

Figure 6:
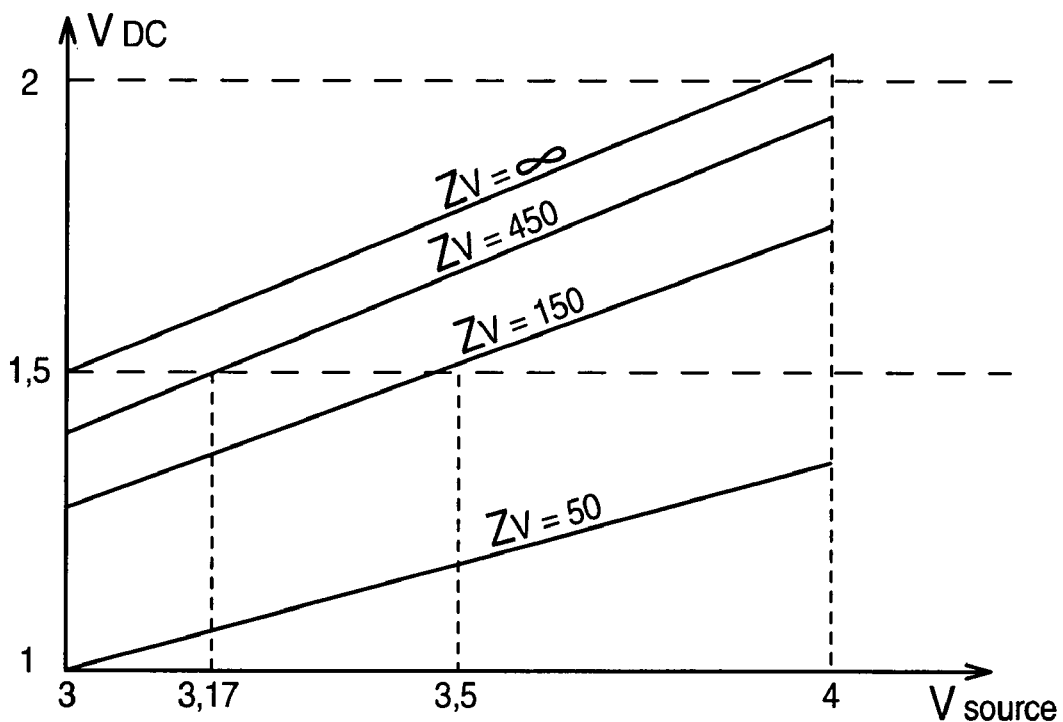
FIG. 6 is a diagram giving the voltage at the terminals of the reservoir capacitance of the RFID device shown in FIG. 3 as a function of the source voltage with different values of the variable impedance used within the scope of the invention.

With reference to FIG. 6 representing the value of the voltage $V_{DC}$ as a function of the voltage Vsource, we see that the higher the value of Zv, the easier an adequate value of $V_{DC}$ can be obtained. As a result, with a low Zv value of 50Ω, Ze is equal to 25Ω and thus a voltage value Vsource clearly above 4 volts is required so that the voltage $V_{DC}$ is greater than the threshold voltage of 1.5 volt below which the device no longer operates. This relatively high source voltage is impossible to obtain when the RFID device is a long way from the reader.

With a Zv value equal to 150Ω, we see that the $V_{DC}$ value exceeds 1.5 volt when the Vsource voltage is equal to 3.5 volts, which is easier to obtain. With a value of Zv equal to 450Ω, we see that the voltage $V_{DC}$ is greater than 1.5 volt as soon as the voltage Vsource is greater than 3.17 volts. Finally, if the value of Zv is larger and larger and tends towards infinity, the voltage $V_{DC}$ is greater than 1.5 volt for any Vsource value greater than 3 volts. It should be noted that in the absence of the invention and thus without the presence of an impedance Zv in series with the switch 22, the impedance of the switch alone is very small, in the order of 4Ω, and the voltage $V_{DC}$ takes a value that is much lower than the threshold value of about 1.5 volt.

Figure 7:
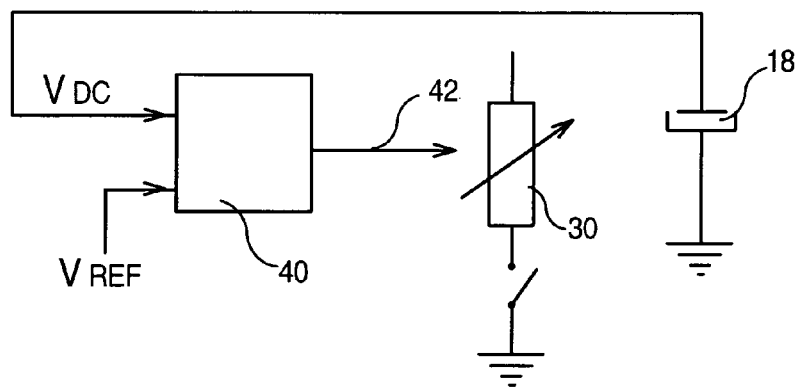
FIG. 7 is a block diagram representing the variable impedance and its control by an analog comparator according to a first embodiment of the invention.

The detection means for the voltage VDC can be manufactured according to two methods. In a first embodiment shown in FIG. 7, an analog comparator 40 receives as input signal the voltage $V_{DC}$ coming from the reservoir capacitance 18. The comparator 40 carries out a comparison between this value and a predetermined value $V_{REF}$. By taking into account the difference between VDC and $V_{REF}$, the comparator 40 transmits a control signal on its output 42 to adjust the value of the variable impedance 30 as explained above. It must be noted that the value $V_{DC}$ used as input to the comparator could be any other value depending directly on the voltage $V_{DC}$ measured at another point such as, for example, the connection between two impedances in series powered by the voltage $V_{DC}$.

Figure 8:
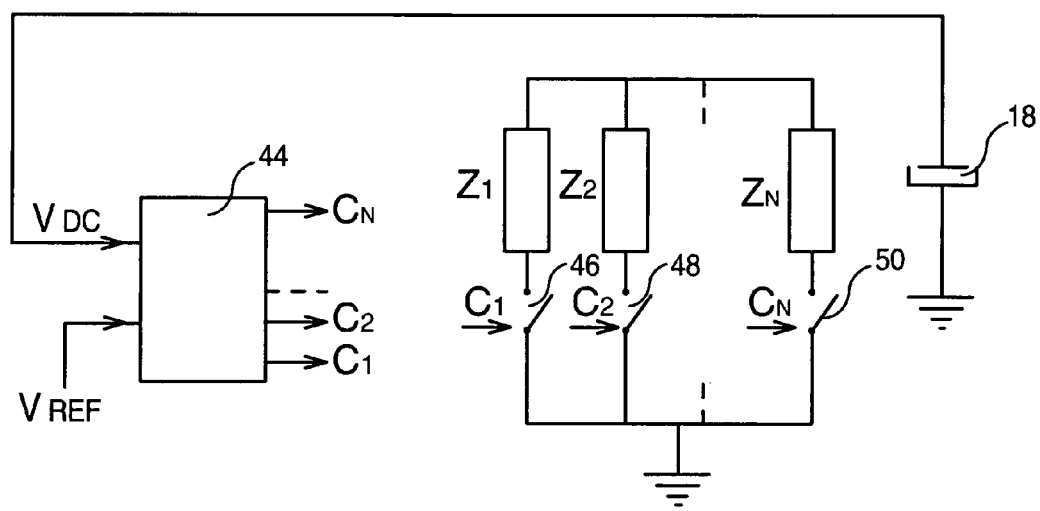
FIG. 8 is a block diagram representing the variable impedance and its control by a digital comparator according to a second embodiment of the invention The main idea behind the invention is simple. As soon as the RFID device is at a large distance from the reader, and thus has reached its operating limits, energy must not be wasted. One must therefore avoid applying an abrupt retromodulation requiring a high power and requiring the device to exhaust its reservoir capacitance. The invention therefore consists in applying a gentle retromodulation minimizing the discharge of the reservoir capacitance for an operation at the same distance and therefore allowing the device to operate at lower power.

According to a second embodiment shown in FIG. 8, a digital comparator 44 is used instead of the analog comparator 40 and the variable impedance is replaced by several impedances of predetermined value in parallel. By taking into account the difference between the value $V_{DC}$ (or another value in direct relation with $V_{DC}$ as mentioned above) and the predetermined value $V_{REF}$, the comparator 42 transmits as output a control signal $C_1, C_2, \ldots C_N$. Each of the output lines controls the closing of a switch in series with one of the impedances. In this manner, the switch 46 in series with the impedance $Z_1$ is controlled by the control output $C_1$, the switch 48 in series with the impedance $Z_2$ is controlled by the control output $C_2$, and the switch 50 in series with the impedance $Z_N$ is controlled by the control output $C_N$. Assuming that the output $C_2$ is active, the switch 48 is closed and the impedance $Z_2$ is used as impedance Zv as seen above. It should be noted that the impedance values $Z_1, Z_2, \ldots Z_N$ must always be judiciously selected in order to obtain an adequate voltage value whatever the distance between the device and the reader.

The invention claimed is:

1. A radiofrequency identification device (RFID) comprising an antenna connected to a chip designed to be affixed to an object to be identified by a remote reader transmitting to the identification device electromagnetic signals received by said antenna and containing the data allowing the identification as well as the supply voltage ($V_{DC}$) of said device, said antenna transmitting in return to said reader signals provided by said chip by retromodulation by means of a switch in said chip whose open or closed position defines the digital identification data transmitted by said device;

wherein said chip comprises a variable impedance connected in series with said switch to the terminals of said antenna and a means for detection of said supply voltage to adjust said impedance value so that this supply voltage is always greater than a predetermined value (Vthreshold) below which the device can no longer transmit said digital identification data.

2. The device according to claim 1, wherein said chip further comprises a reservoir capacitance supplying said supply voltage ($V_{DC}$) at its terminals.

3. The device according to claim 2, wherein said means of detection of said supply voltage ($V_{DC}$) is an analog comparator whose output controls the value of said variable impedance in response to the difference between the value of said supply voltage and a predetermined voltage value $V_{REF}$.

4. The device according to claim 2, wherein said variable impedance consists of several impedances each in parallel and each having a predetermined value, with each of said impedences connected in series with a switch whose open or closed position defines the digital identification data transmitted by said device and wherein said means of detection of said supply voltage ($V_{DC}$) is a digital comparator whose outputs ($C_1$, $C_2$, ... $C_n$) respectively control the closing of one of said switches in series with said impedances of predetermined value.

* * * * *